United States Patent
Kargman

(10) Patent No.: US 7,197,478 B2
(45) Date of Patent: Mar. 27, 2007

(54) RAPID ENTRY SYSTEM FOR THE PLACEMENT OF ORDERS VIA THE INTERNET

(76) Inventor: James B. Kargman, 2223 N. Burling, Chicago, IL (US) 60614

( * ) Notice: Subject to any disclaimer, the term of this patent is extended or adjusted under 35 U.S.C. 154(b) by 330 days.

(21) Appl. No.: 10/378,292

(22) Filed: Mar. 3, 2003

(65) Prior Publication Data

US 2003/0158790 A1    Aug. 21, 2003

(51) Int. Cl.
*G06Q 30/00* (2006.01)
(52) U.S. Cl. ........................................................ 705/26
(58) Field of Classification Search ................. 705/26, 705/27
See application file for complete search history.

(56) References Cited

U.S. PATENT DOCUMENTS

| | | | | |
|---|---|---|---|---|
| 5,590,199 | A * | 12/1996 | Krajewski et al. | 713/159 |
| 5,883,810 | A * | 3/1999 | Franklin et al. | 700/232 |
| 5,909,492 | A * | 6/1999 | Payne et al. | 705/78 |
| 5,960,411 | A * | 9/1999 | Hartman et al. | 705/26 |
| 5,963,915 | A * | 10/1999 | Kirsch | 705/26 |
| 2002/0178186 | A1* | 11/2002 | Parry | 707/513 |
| 2004/0243520 | A1* | 12/2004 | Bishop et al. | 705/75 |

FOREIGN PATENT DOCUMENTS

JP    2000-148617    *   5/2000

OTHER PUBLICATIONS

Metcalfe, B. "Open Market brings real money to the Web with clever purchasing setup" Jul. 3, 1995, InfoWorld, vol. 17, No. 27.*
http://www.worldlinklearning.net/ei/mod0105_act_sfb.html "Voyage 1.5: Save Favorite or Bookmark a Web Page".*
"Computer Dictionary" Second Edition, Microsoft Press 1994, pp. 164-167, 205.*
MacLeod, Don "The Internet, LEXIS and WESTLAW: a comparison of resources for the legal researcher", Database, v19, n1, p. 50, 1996, Retrieved from Dialog File: 148, Acc#: 08471834.*

* cited by examiner

*Primary Examiner*—Naeem Haq
(74) *Attorney, Agent, or Firm*—Schiff Hardin LLP

(57) ABSTRACT

A system for placing and executing electronic commercial transactions via the Internet. A customer transmits a transaction code to a vendor. The transaction code is a URL that includes the vendor's Internet address, and parameters associated with a preconfigured commercial transaction. Transaction codes can be stored by the customer's computer as icons, and/or web browser bookmarks. The transaction code is received by the vendor, and the desired preconfigured commercial transaction is identified. The identified transaction is then automatically executed. The vendor may request order verification or entry of an authorization password prior to executing the order.

15 Claims, 5 Drawing Sheets

RAPID ENTRY SYSTEM FOR THE PLACEMENT OF ORDERS VIA THE INTERNET

BACKGROUND OF THE INVENTION

1. Field of the Invention

This invention relates in general to the conducting of electronic commerce, such as the purchasing of goods and/or services over the Internet. In particular, the invention relates to a system for convenient rapid entry of repeat orders for goods or services with minimal effort on the part of the user.

2. Background Art

In recent years, the volume of commerce transacted on the Internet has grown dramatically. Internet users enjoy the convenience of learning about products, comparison shopping, and placing orders for goods and services at any time of the day or night, from a personal computer all without leaving their home or office.

Due in good part to its speed, breadth and efficiency, Internet shopping has pervaded nearly every aspect of commerce. Consumers and businesses alike now conduct a vast array of commercial transactions electronically, including such things as requesting restaurant delivery service, booking travel reservations, and purchasing products such as groceries, electronics, books, household supplies, office supplies, furniture, kitchen equipment, and prescription drugs.

As more users incorporate electronic commerce activities into their daily lives and as more type of goods and services become available for purchase, it becomes highly desirable to maximize the convenience of conducting commercial activities via the Internet. The frequency with which an individual uses an Internet service tends to increase with the simplicity and convenience of using the service. This is particularly the case for consumable goods that must be ordered by a consumer on a periodic and ongoing basis. Therefore, it is highly desirable, and is an object of this invention, to provide a system for improving the speed and efficiency of conducting commercial transactions via the Internet.

One common prior art technique attempting to streamline the process of placing an order via the Internet is the use of customer accounts. The first time an individual places an order for goods and services from a particular vendor's Internet web site, the prospective customer is asked by the vendor to provide necessary personal information, such as name, address, telephone number, credit card number, etc. That information is then stored by the vendor for use should that customer return to the vendor's web site and place a future order. The customer is typically assigned a user name and password. Upon reentering the web site the customer, by entering his or her username and password during the placement of future orders, can place orders without undergoing the time consuming re-entry of the required personal information. However, for such future orders, the customer must still go through the effort of manually logging in to the vendor's Internet web site, and specifying the parameters of the order, such as selecting one by one each of the items sought to be ordered together with other specifics such as particular delivery service desired.

Another prior art technique, disclosed by U.S. Pat. No. 5,960,411, is a "1-click" ordering technique by which a previously registered user can place an order for an item immediately by selecting that item on the vendor's web site. This technique seeks to improve the efficiency of placing an order via the Internet by allowing the user to circumvent the steps of placing each of items sought to be purchased in a virtual "shopping card", checking out, selecting shipping options, and completing various other steps that may otherwise be required to complete and confirm an order. However the Internet electronic commerce system disclosed in the '411 patent, still requires that the user go through the effort of (1) first launching an Internet web browser software application, (2) logging into and entering the vendor's web site, (3) navigating the vendor's web site to locate the desired items or services to be ordered, and (4) tagging each the items desired, which are only then processed as an order.

As users increasingly turn to the Internet for their daily needs, many users find themselves repeatedly engaging in common transactions over the Internet. For example, a user may have a favorite pizza delivery restaurant, from which they regularly order a large pepperoni pizza and a bottle of soda for immediate delivery. Prior art systems of placing orders via the Internet require the user to enter all the details of such a desired order each time the order is placed. Some users may be dissatisfied, or even deterred from placing an order online, due to the ensuing inconvenience and effort of specifying and placing the order. Even under the "1-click" system, the user must specify the contents of each order each time the web site is visited, even if the same order is placed time and time again. By minimizing the effort required by a user to place an electronic order with a vendor, the likelihood of that user placing the order with the vendor is maximized. Therefore, it is an object of this invention to allow users to place repeat orders automatically, with minimal effort on the part of the user.

These and other objects of the invention will become apparent to one of ordinary skill in the art in view of the disclosure provided herein.

SUMMARY OF THE INVENTION

The invention provides for the automatic placement and execution of commercial transactions via the Internet. A customer transmits a transaction identification code from the customer's computer to a computer system associated with a vendor of goods or services. The transaction identification code may be a Universal Resource Locator ("URL"), which is transmitted by web browser software. The URL contains information including the Internet address of the vendor's electronic commerce computer system, and parameters with which the preconfigured transaction is associated. The parameters may include information identifying the customer, such as logon name and password, and/or a parameter uniquely identifying the transaction desired. After receiving the transaction identification code, the vendor references an electronic database to identify the preconfigured electronic transaction that is associated with the code received. Finally, the preconfigured transaction is automatically executed.

The preconfigured transactions can be configured by the customer through the use of an Internet web site associated with the vendor. The customer can use a computer with web browser software to visit a vendor web site, and electronically prepare a commercial transaction using methods known in the art. Once a transaction is prepared, the user can elect to associate the transaction with a transaction identification code for later automatic order placement. The invention may generate a transaction identification code URL, which can be stored on the user's computer as a graphical icon. Thus, the configured transaction can later be automatically placed by selecting the stored icon. Alternatively, the URL can be stored within a pulldown menu "bookmark" system associated with an Internet web browser, such that the transaction can be placed by selecting it within the pulldown menu system. Accordingly, techniques previously used for file system organization or Internet web site address organization can also be used to store and reference electronic commercial transactions.

The system may, optionally, request verification or confirmation of an automatically placed order prior to its execution. The vendor computer system may display an order summary through the customer's web browser interface, and request confirmation before the order is processed. Alternatively, a password may be associated with the preconfigured commercial transaction. After identifying the preconfigured transaction associated with the identification code, the vendor may query the user for the entry of a password that is associated with the preconfigured transaction. If the password is correctly entered, the order is processed. In another password embodiment, part or all of the transaction identification code may be encrypted with a key. The vendor system may then request that the user enter a decryption key as a password. If the key is entered properly, the code is decrypted and the transaction can be properly executed.

In another embodiment, the transaction identification code may contain parameters specifying the transaction details, such that preconfigured transaction information need not be stored by the vendor. Such parameters may include customer identification parameters, such as a username and password to reference the customer's associated address and billing information, and data specifying the goods or services desired. Accordingly, the vendor need only identify the customer information associated with the customer identification parameters before executing the transaction.

DETAILED DESCRIPTION OF THE DRAWINGS

Figure 1:
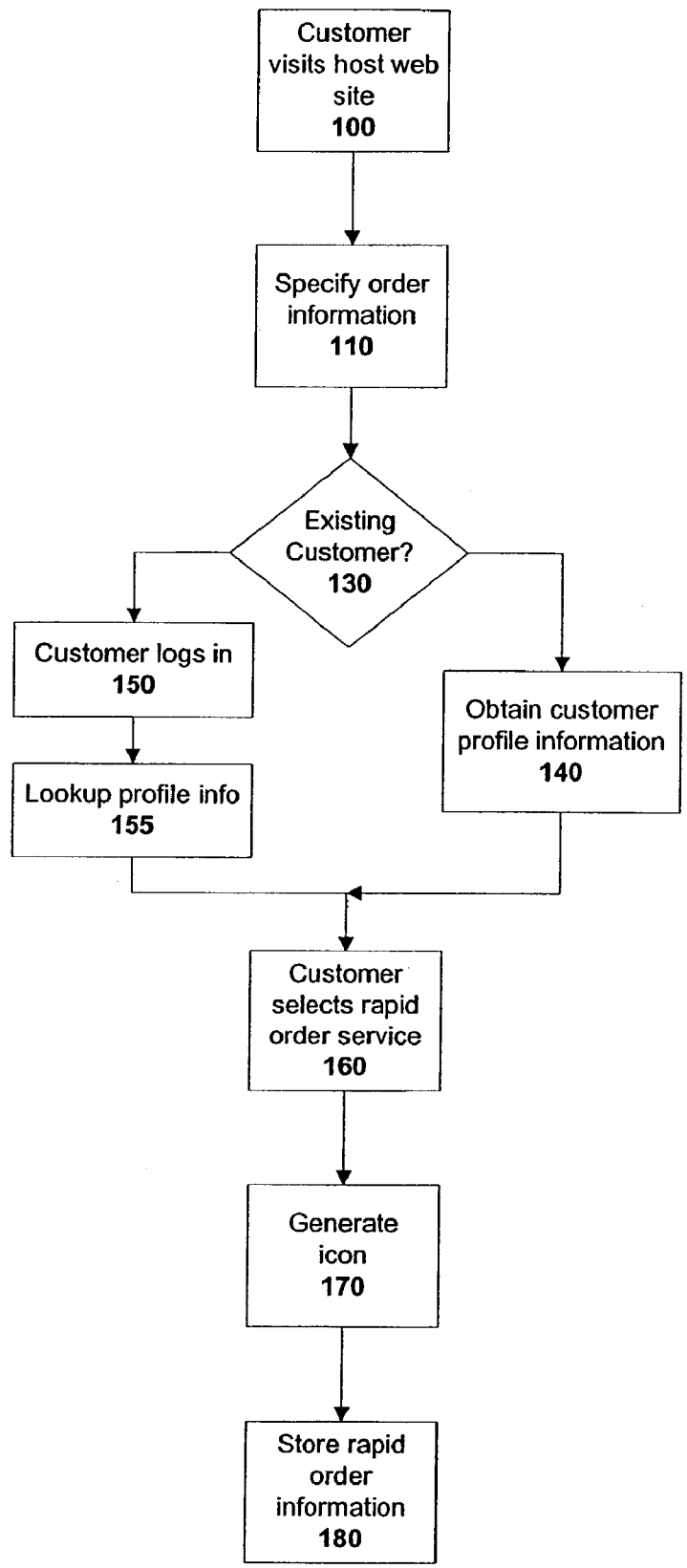
FIG. 1 is a flowchart depicting the process of setting up an automatic order icon.

While this invention is susceptible to embodiment in many different forms, there are shown in the drawings and will be described in detail herein several specific embodiments. The present disclosure is to be considered as an exemplification of the principle of the invention intended merely to explain and illustrate the invention, and is not intended to limit the invention in any way to embodiments illustrated.

In the embodiment illustrated by FIG. 1, a vendor implements the rapid ordering system of this invention in association with an Internet World Wide Web site through which the vendor sells its goods or services. In step 100, the customer visits the vendor web site using an Internet access device, such as a personal computer. While the use of personal computer as an Internet access device is used as the primary example of the present invention, other Internet enabled devices are deemed within the scope of the present invention. A handheld computer with wireless modem, a personal digital assistant (PDA) or an Internet-enabled cellular or PCS telephone are but a few examples of other devices which may access the Internet using the present invention.

The customer then configures an order that is to be set up for later automatic placement using the vendor's web site, step 110. The order may be configured through a method and interface known in the art, appropriate for the type of good or service provided. As an example, a pizza delivery service customer may define an order by using the restaurant's web site to specify a medium pepperoni pizza and liter of soda, for delivery as soon as possible. As another example, a customer of an office supply vendor may define an order as 1000 black pens, to be shipped via second-day air delivery.

To process the order, the vendor's system must initially acquire certain necessary user information. For example, user information may include the customer's name, address, credit card number and other "preference" information, such as shipping instructions. Accordingly, in step 130, the system determines whether the customer has previously registered with the vendor such that the user information would already be on file. If not, the vendor's system queries the customer for the necessary user information, step 140. If the customer is an existing user, the system queries the customer for a previously assigned username and password, step 150, with which the vendor's system can lookup previously-acquired user information, step 155.

In addition to providing order and user information, the customer selects the rapid order service to set up a rapid order entry icon, step 160. The vendor's web site then generates the order icon for storage on the user's computer, step 170. In one embodiment, the vendor's web site generates a specific URL for a web page that appears in the user's web browser software. The user can then click on the URL and drag it onto the user's desktop, or into some other folder or storage location, where it appears as an icon. In another embodiment, the vendor web site executes an Active X control to automatically write the appropriate icon file onto the user's desktop, or into another selected file folder.

In the embodiment illustrated, the URL contains a unique encoded rapid order identification parameter that is arbitrarily generated and stored by the vendor in association with the customer's identity and the specific order information, step 180. Alternatively, in another embodiment, parameters of the generated URL may include an encoded parameter associated by the vendor with the customer's stored user information only, and one or more additional parameters indicative of the actual rapid order information.

Figure 2:
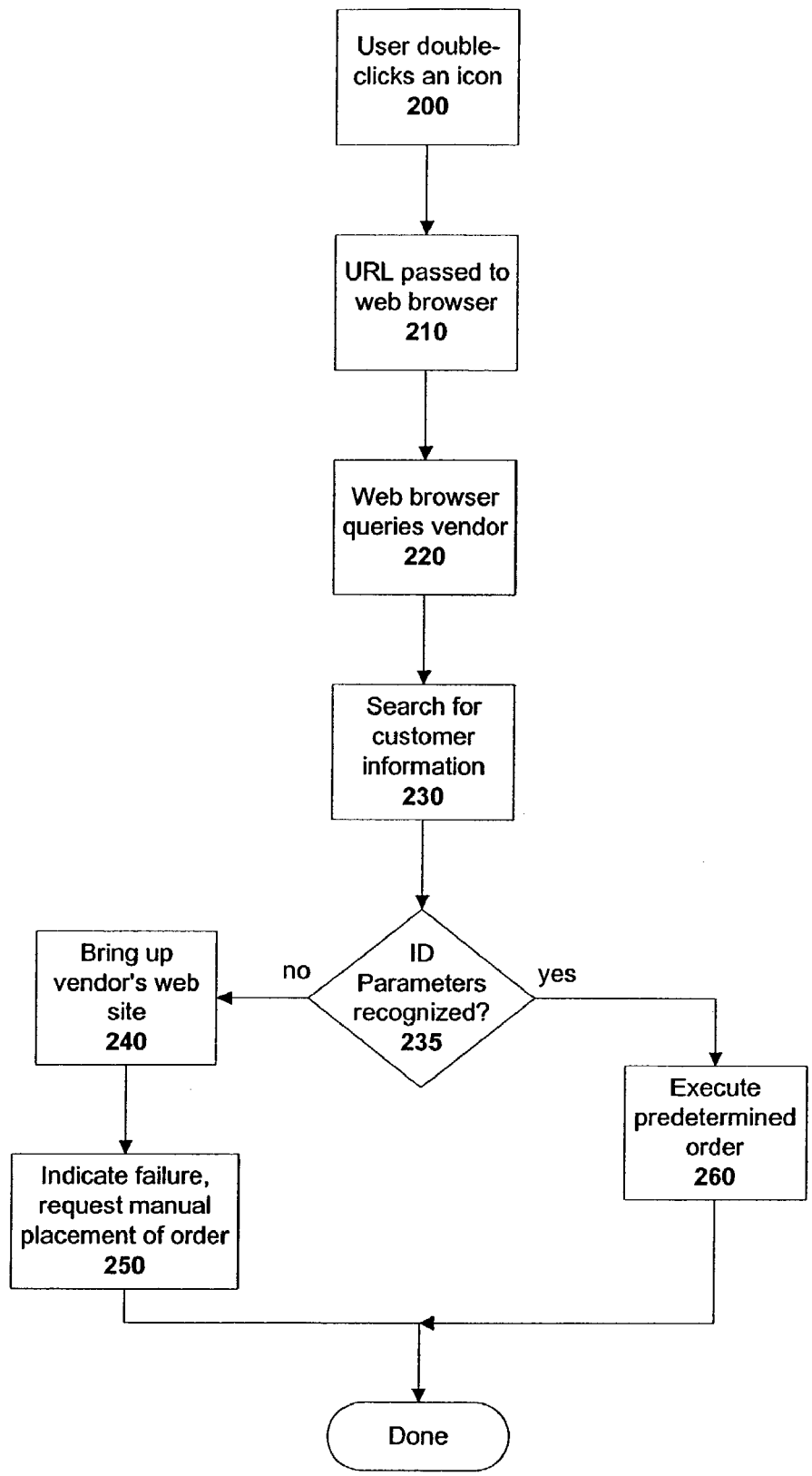
FIG. 2 is a flowchart depicting the activation of an icon for the automatic placement of an order.

Once an order icon is created, it may be utilized repeatedly by the customer in the future to automatically place the preconfigured order in a last order recall mode. FIG. 2 illustrates an order placement procedure. While using a computer on which an order icon has been created, the user simply clicks on the icon to activate it, step 200. Either a single click or multiple clicks depending upon the operating system and configuration will activate the icon. In the context of an Internet enabled cellular or PCS telephone, an icon or other graphic or shortcut command may be activated by a single key-press when such device is in an Internet browser connection mode. In accordance with technology known in the art, such as that implemented by Microsoft Windows-based personal computers, the icon automatically passes the URL stored within the icon to Internet web browser software installed on the user's computer, step 210. The web browser then transmits the URL query to the address specified therein, step 220. The vendor's system receives the URL query, and extracts and decodes from the URL the identification parameters appended to the vender address. The vendor system then searches its database of previously stored rapid order information to locate the customer and order information associated with the received identification parameters, step 230. If the vendor locates customer order information properly associated with the received identification parameters, step 235, that order is automatically processed according to the vendor's own order processing procedures, step 260. Optionally, the vendor could transmit a query to the user through the user's web browser interface to confirm that placement of the order is intended, or that the delivery address is correct.

If the decoded identification parameter is not recognized in step 235, the vendor returns a web page to the customer's web browser, step 240. The web page indicates to the customer that the automatic order could not be verified, and allows the user to manually place an order according to the vendor's normal order process, step 250.

In another embodiment of the present invention, the icon generated by the vendor web site may be associated with a short script stored on the user's computer that pops up a window requesting confirmation of the order by the user before transmitting any information to the vendor system. Once the user is presented with an "Are you sure?" query, and responds by clicking on a YES box, the predetermined order URL is passed to the user's web browser software, and the order is thereafter placed according to the method otherwise described above.

In some circumstances, it may be desirable to require the entry of a password before placement of an automatic order. This feature provides increased security so that, for example, a child accessing a computer cannot automatically place orders for the delivery of pizzas. Such a feature may also help prevent a user from accidentally ordering products that are not currently desired.

Figure 3:
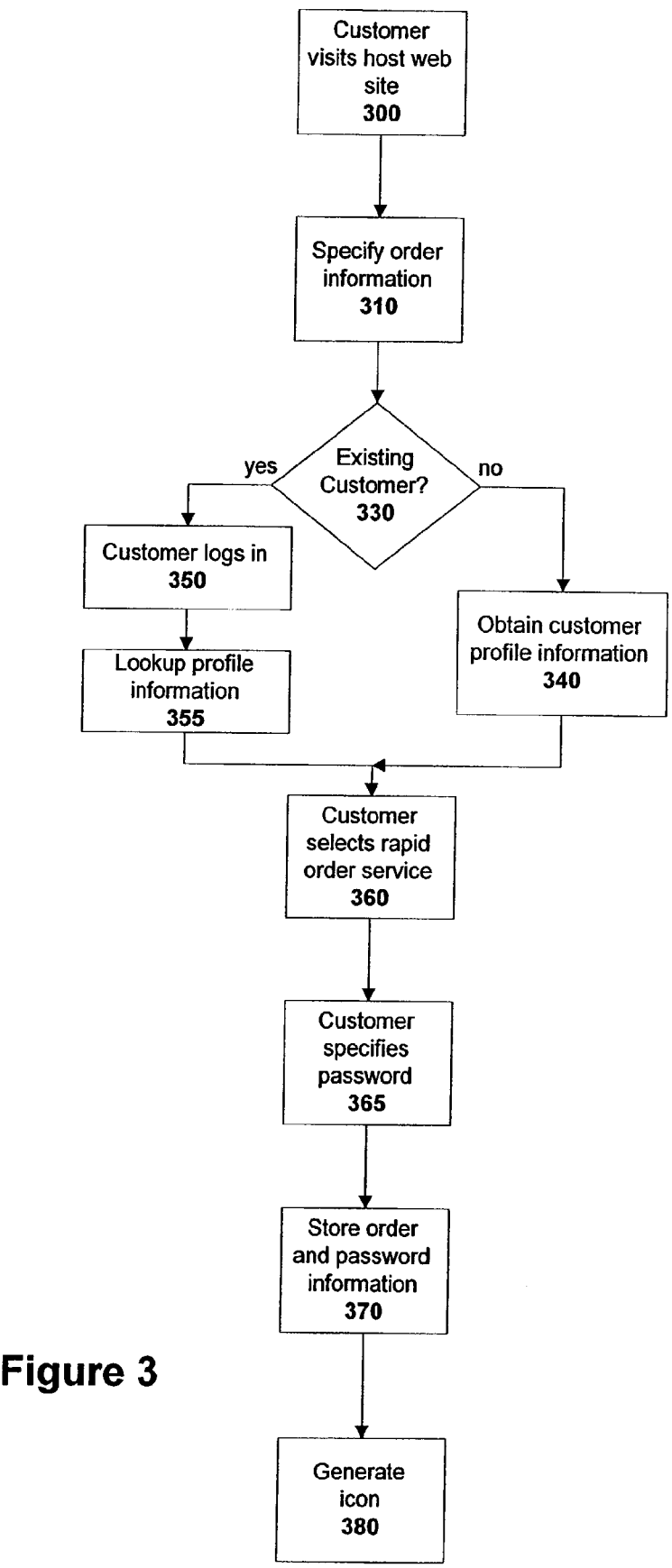
FIG. 3 is a flowchart illustrating the setup of an automatic transaction that requires password verification.
Figure 4:
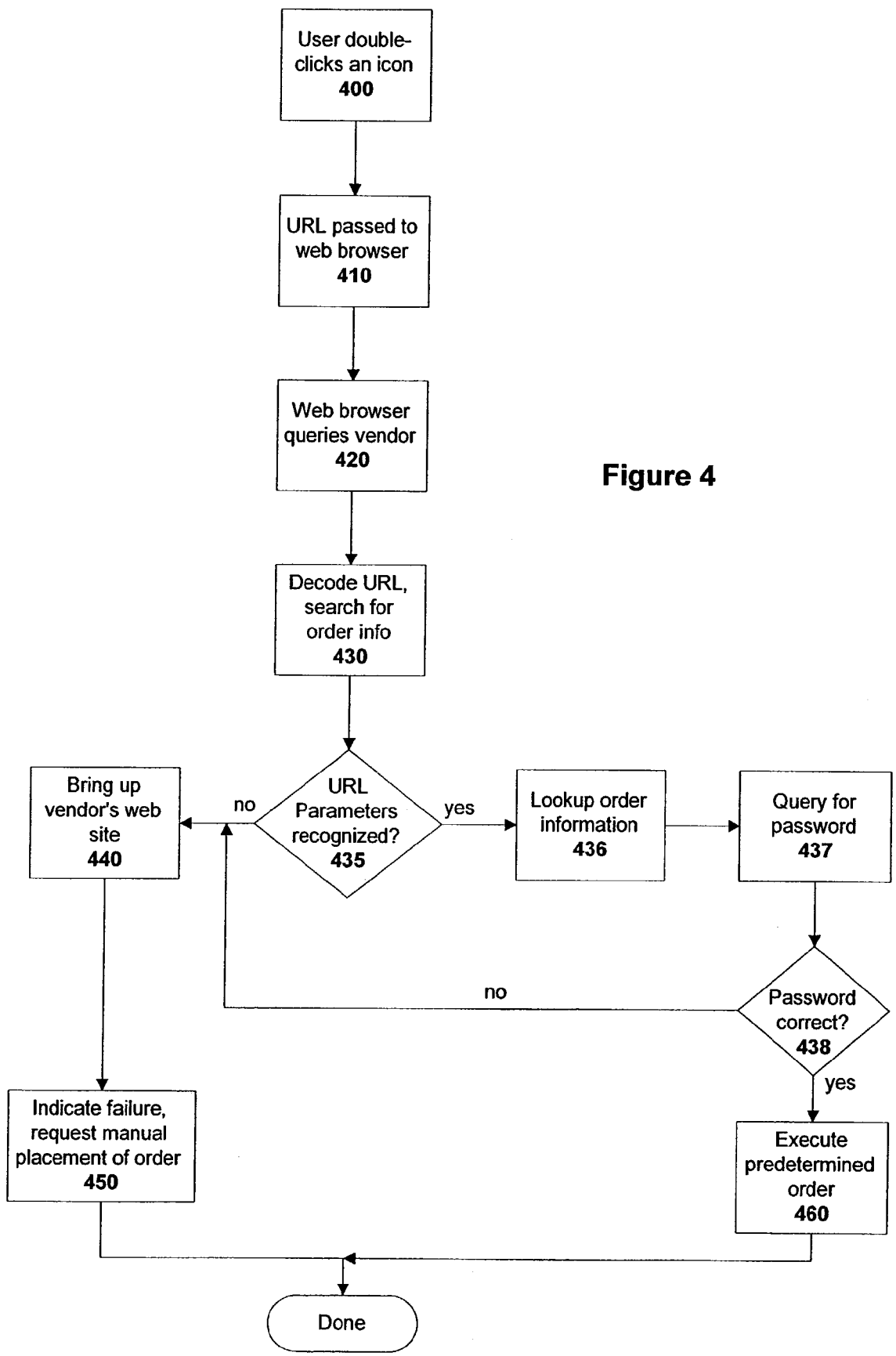
FIG. 4 is a flowchart showing the automatic placement of an order requiring password verification.

One embodiment providing a password feature is depicted in FIGS. 3 and 4. As in the embodiment of FIG. 1, the user visits a vendor web site, step 300, and specifies order information, step 310. If the user is a previously existing customer, 330, then the user logs in, step 350, and the user's previously stated customer profile information is recalled, step 355. Otherwise, the system obtains customer profile information from the user and establishes a new user account, step 340. In step 360, the customer indicates a desire to set up rapid order service for the order. The customer then specifies a password that should be entered to verify each automatic placement of the order, step 365. The password is stored along with the order information by the vendor system, step 370, and an icon is generated on the user's computer according to a previously described method, step 380. If the vendor provides for orders both with and without password verification, the parameters incorporated within the icon URL indicates to the vendor that a password should be entered before the automatic order is processed.

When such an automatic order is placed requiring a password, FIG. 4, the user clicks on the previously-generated icon, step 400, thereby passing the stored URL to the user's web browser software, step 410. The web browser transmits a query to the vendor system, step 420, and the vendor system inspects the URL parameters and searches for customers and order information associated therewith, step 430. If the parameters are recognized, step 435, the vendor system looks up the previously stored automatic order information, step 436, thus recalling the password required for automatic order authorization. The system queries the user for entry of the password via the user's web browser interface, step 437. If the password is entered correctly by the user, step 438, then the preconfigured order is automatically executed, step 460. If the password is not entered correctly in step 438, the vendor's web site is brought up by the user's web browser, step 440, and the system indicates that automatic order placement has failed and offers to allow the user to place a new order manually, step 450.

Figure 5:
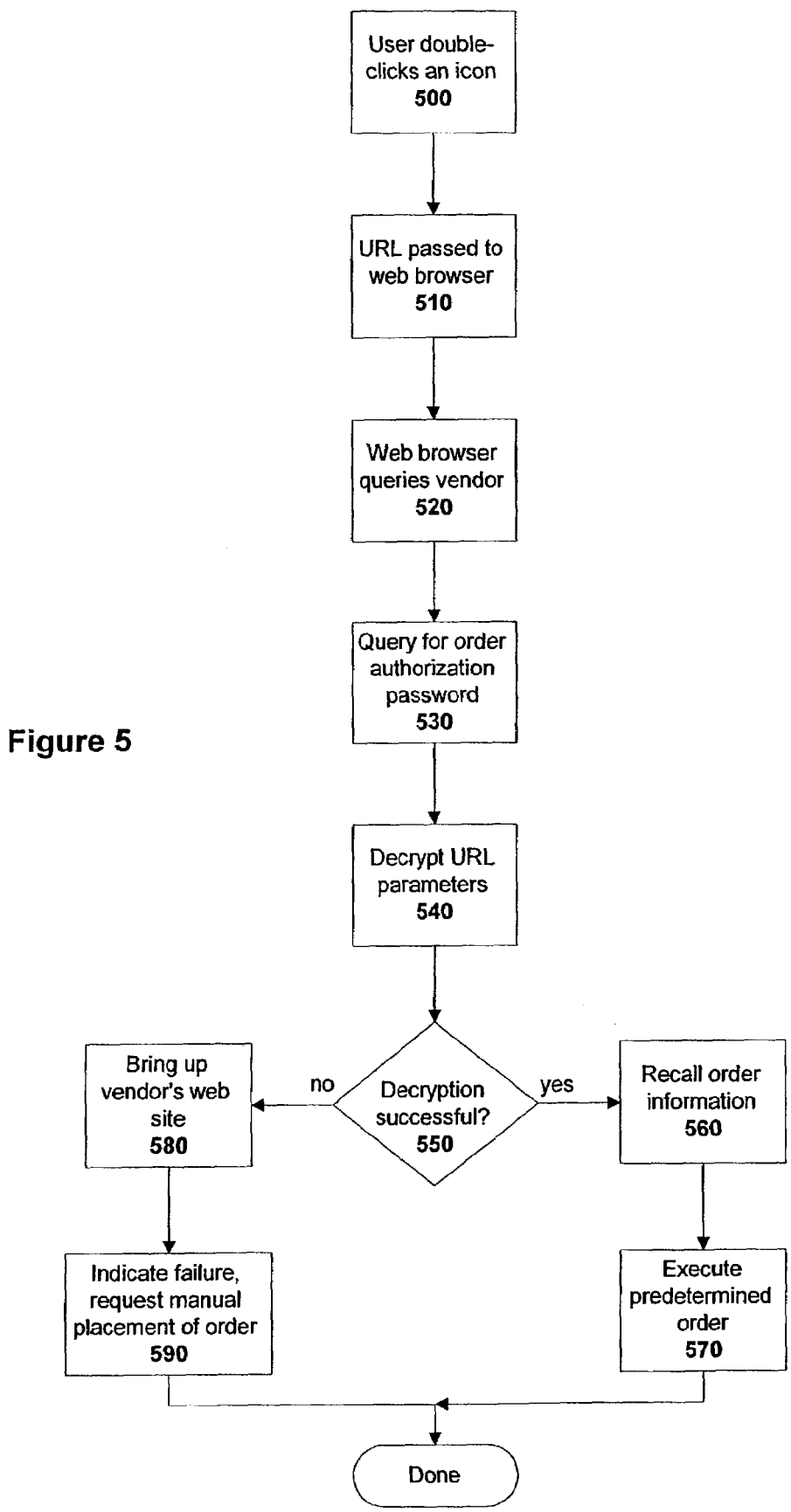
FIG. 5 is a flowchart illustrating the placement of an order using encrypted URL parameters.

As an alternative to the password embodiment illustrated in FIGS. 3 and 4, a password specified by the user could instead be used by the system as an encryption key with which the URL parameters are encrypted. Such a password need not be stored by the vendor system. FIG. 5 illustrates the automatic order placement procedure for such an embodiment. After the user clicks on the rapid order icon, step 500, the URL is passed to the user's web browser software, step 510, the web browser queries the vendor web site, step 520, and the vendor web site returns a query for the order authorization password, step 530. After the user provides a password, the vendor system then attempts to decrypt the URL parameters using the provided password as the key, step 540. If the resulting URL parameters are recognizable, and therefore properly decrypted, step 550, then the user's stored order information is recalled, step 560, and the order is automatically placed, step 570. However, if the provided password is not the proper decryption key, then the improperly decrypted URL parameters will not be recognizable, step 550, and the vendor redirects the user's web browser to its main web site, step 580, allowing the user to manually place the desired order, step 590.

Another embodiment of the present invention provides for an interrupt option which provides an additional margin of safety whereby after placing an order the user could using an interrupt key stroke or other hot link on a web site command that the order be held or cancelled.

It is expected that the foregoing embodiments of the present invention will meet the needs of most users and vendors, especially those users using personal computers to access the Internet. However, in some circumstances, it may be desirable to allow a user greater control and options, such as to trigger a particular host response during the next use of the icon.

In the "last order recall" mode of the present invention the URL serves to place a pre-configured order. However, it may be useful to have the user have the ability to configure an icon for automatic ordering over the Internet without first having to access a vendor web site. A vendor may thus supply a computer program which serves as the tool for creating the URL which becomes associated with the icon. This tool would be used, for example, in the context of an Internet enabled cellular or PCS telephone which may not have full web browsing capabilities. The service provider may maintain a database and menu program which may be used by the user to configure an order which is then maintained on the telephone user interface as an icon or other key stroke activated command.

Such an icon generation tool may be provided to sophisticated computer users as well. A user who may repeatedly order a single pizza may wish to order on a subsequent occasion three pizzas. Using the icon tool the user could edit the URL associated with the icon to cause three pizzas to be ordered instead of one.

Alternatively, in place of an icon edit tool, in one embodiment of the invention, a user can trigger a desired host response by manually appending a particular character onto the end of the URL parameter string. For example, when using a computer with the Windows operating system, a user can "right-click" on an order icon to view and modify the icon Properties, including the target URL. A predetermined specification disclosed to advanced rapid order icon users specifies characters that can be appended to a rapid order URL to invoke a desired vendor system response. In the embodiment illustrated, appending a "$" character at the end of the URL provokes the vendor system to require entry of a predetermined password through the user's web browser prior to the placement of the order. Appending the "%" character onto the URL signals the vendor system to allow convenient transaction parameter revision, such as changing order quantity or shipment method through a transaction summary interface invoked in the user's web browser. Appending the "&" character onto the parameter list allows the customer to add, change or delete options and features of the icon, such as pizza=large. Finally, appending the "^" character onto the parameter list triggers a special predetermined host function, such as test and validate, or some other potentially syntax-dependent function. When the system detects a URL parameter string with one of these characters appended thereto, the system enters the corresponding mode, allowing for the necessary interaction through the user's web browser. A URL may look as follows: "http://test.quikorder.com/scripts/mgwms32.dll?MGWLPN=MWEBLINK&wlapp=QUIKORDER& guid=&USERNAME=R04992756901&USERPW=R04562276198&FASTORD=1"

In another embodiment, the option to instigate host interaction can be presented to the user on a previously-described order confirmation query through the user's web browser software. In addition to presenting the user with the option to confirm that placement of the order is intended, and that the delivery address is correct, the user is also presented with a graphical user interface allowing the user to toggle order password verification, edit transaction parameters, edit icon parameters, or trigger special predetermined host functions.

A further beneficial aspect of the present invention is that it allows a user to efficiently manage and organize commercial transactions with techniques previously used for file management or Internet web site bookmark organization. Transaction icons as described herein can be stored in file system directory structures which appear as folders to a user. For example, a user may maintain a folder entitled "FOOD" in which food delivery order icons may be maintained. Such a folder may include a pizza icon that automatically places an order to the user's favorite pizza delivery restaurant, a sandwich icon that places an order from the user's favorite delivery submarine sandwich shop, and a Chinese icon that places a delivery order with the user's favorite Chinese delivery restaurant. Accordingly, when the user decides to have food delivered, he simply opens up the FOOD folder on his computer and clicks on the icon corresponding to the type of food desired. Similarly, an office supply clerk may have a file folder called SUPPLIES with separate icons for ordering pens, copier paper, highlighters, and laser printer toner, where the clerk need only click on the icon indicating the supply currently desired.

The use of an icon as an order mechanism also allows a user to organize transactions on drag-and-drop icon bars, such as the taskbar incorporated into the Microsoft Windows computer operating system, or within a cascading popup menu system, such as the Windows Start menu.

Another transaction management system that can be used in conjunction with the present invention is a web browser pulldown menu system, such as the Favorites or Bookmarks pulldowns commonly used by some web browsers known in the art. Because the automatic order mechanism is comprised of a URL with associated parameters, the transactions can be stored and organized in a Favorites or Bookmarks pulldown directory, just as typical web page addresses are stored. Accordingly, commercial transactions can be placed conveniently and automatically by navigating such preexisting pulldown menu structures. However, instead of bringing up web pages, the rapid order URLs transmit order requests.

In accordance with another aspect of the invention, the transmission of an order URL described herein can be triggered automatically by other software applications. The software applications execute a rapid order URL in response to the satisfaction of a predetermined condition. For example, in one embodiment of this aspect of the invention, a computer laser printer driver can be developed which executes a rapid order icon when it detects that the toner level in the laser printer is low. The rapid order URL can be configured to place an order for additional toner from the user's favorite computer supply store using the electronic commerce system described herein. In another sample embodiment of the invention, a datebook program can be configured to execute a rapid order URL on a regularly scheduled basis, such as on Sunday of each week. The order URL can be configured to place an order for a gallon of milk from the user's preferred online grocery store, thereby ensuring a regular delivery of fresh milk.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. A method of electronically executing a commercial transaction between a customer and a vendor, the method comprising the steps of:

preconfiguring a commercial transaction, wherein a vendor system associates information required for processing the commercial transaction with an Internet-protocol-based transaction identification code which is comprised of a network address associated with the vendor, and an encoded transaction parameter with which a preconfigured commercial transaction is uniquely associated;

storing the transaction identifier within a storage system implemented by an electronic device associated with the customer;

allowing the customer to append a special code onto the end of the transaction identification code in order to invoke a desired response from the vendor system;

automatically initiating contact with a vendor system, accessing the stored transaction identification code, formatting the transaction identification code for transmission, and transmitting the transaction identification code from the customer to the vendor system via a communications link, where the initiating, accessing, formatting, and transmitting is performed automatically upon the customer issuing a single command;

decoding the transaction parameter by the vendor system;

identifying a preconfigured commercial transaction associated with the transaction identifier by the vendor system; and executing the preconfigured commercial transaction in accordance with the special code appended to the end of said transaction identifier.

2. The method of claim 1, in which the transaction identification code is a Universal Resource Locator ("URL").

3. The method of claim 2, in which the URL is stored within a pulldown menu system integrated within web browser software on a computer used by the customer.

4. The method of claim 1, in which the encoded transaction parameter is encrypted.

5. The method of claim 4, in which the step of identifying a preconfigured commercial transaction is comprised of the substeps of:

receiving a decryption key from the customer;

decrypting the transaction parameter using the received key;

choosing a preconfigured commercial transaction that is uniquely associated with the decrypted transaction parameter.

6. The method of claim 5, in which the decryption key is entered by the customer in response to a request for the provision of a password.

7. The method of claim 1, which the step of executing the preconfigured commercial transaction is comprised of the substeps of:

requesting the entry of a password by the user;

determining that the password entered by the user matches a password previously associated with the preconfigured commercial transaction;

completing the preconfigured transaction.

8. The method of claim 1, the method further including a step prior to the step of transmitting the transaction identification code of generating a graphic representation associated with the transaction identifier code on a computer of the customer.

9. The method of claim 8, in which the information required for processing the commercial transaction includes the quantity and identity of goods ordered, information describing delivery of the goods, payment information, and information identifying the name and location of the customer.

10. The method of claim 8, in which the icon is stored in a file folder.

11. The method according to claim 1, further comprising:

transmitting the preconfigured transaction identification code by a customer computer to a vendor computer on a plurality of occasions, wherein the vendor executes a commercial transaction associated with the transaction identification code following each of the plurality of occasions.

12. The method of claim 11, in which the step of transmitting the preconfigured transaction identification code is comprised of the substep of selecting the preconfigured transaction identification code from amongst a plurality of identification codes displayed on a web browser pulldown menu.

13. The method of claim 11, in which the step of transmitting the preconfigured transaction identification code is comprised of the substep of selecting an icon representing the preconfigured transaction identification code from amongst a plurality of icons displayed by the customer computer.

14. The method of claim 11, wherein the step of transmitting the preconfigured transaction identification code further includes the substep of verifying the transaction prior to the vendor executing the commercial transaction.

15. The method according to claim 1, wherein issuing a single command comprises:

utilizing at least one of a handheld computer with wireless modem, a personal digital assistant, an Internet-enabled cellular telephone and a PCS telephone.

* * * * *